United States Patent
Takeyama et al.

(10) Patent No.: US 8,587,606 B2
(45) Date of Patent: Nov. 19, 2013

(54) APPARATUS AND METHOD FOR PROCESSING IMAGE, AND APPARATUS FOR DISPLAYING IMAGE

(75) Inventors: Yasutoyo Takeyama, Kanagawa-ken (JP); Yoshie Imai, Tokyo (JP); Toshimitsu Kaneko, Kanagawa-ken (JP); Masahiro Baba, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 218 days.

(21) Appl. No.: 12/956,550

(22) Filed: Nov. 30, 2010

(65) Prior Publication Data

US 2011/0157213 A1 Jun. 30, 2011

(30) Foreign Application Priority Data

Dec. 25, 2009 (JP) ................................. 2009-294249

(51) Int. Cl.
    *G09G 5/02* (2006.01)
(52) U.S. Cl.
    USPC ............ 345/590; 345/618; 382/274; 248/703
(58) Field of Classification Search
    USPC .................. 345/590, 618; 382/274; 348/703
    See application file for complete search history.

(56) References Cited

U.S. PATENT DOCUMENTS

| | | | |
|---|---|---|---|
| 6,885,369 B2 * | 4/2005 | Tanahashi et al. | 345/426 |
| 7,583,318 B2 * | 9/2009 | Ok et al. | 348/453 |
| 8,248,431 B2 * | 8/2012 | Shirata | 345/589 |

OTHER PUBLICATIONS

Takanori Tamaki et al., "Color Restoration From Saturated Images-Restration method up to 2 channel saturations-", Mar. 2009. pp. 19-24.

* cited by examiner

*Primary Examiner* — James A Thompson
*Assistant Examiner* — F. M. Hossain
(74) *Attorney, Agent, or Firm* — Oblon, Spivak, McClelland, Maier & Neustadt, L.L.P.

(57) ABSTRACT

According to one embodiment, a first extraction unit extracts a first group of pixels having a specific hue from an input image. A second extraction unit extracts a second group of pixels having large distance from a reference axis on a plane defined by a chroma axis and a luminance axis from the first group. A first transform unit executes a plurality of color-transform processing to the second group and obtains a plurality of third groups of pixels as the second group transformed by each color-transform processing. A reliability calculation unit calculates a reliability of each third group. The reliability is larger when pixels of the third group are more located in shape of a straight line on the plane. A selection unit selects a color-transform processing by which the third group has the largest reliability from the plurality of color-transform processing. A second transform unit executes the color-transform processing to the input image to obtain an output image.

8 Claims, 7 Drawing Sheets

APPARATUS AND METHOD FOR PROCESSING IMAGE, AND APPARATUS FOR DISPLAYING IMAGE

CROSS-REFERENCE TO RELATED APPLICATION

This application is based upon and claims the benefit of priority from Japanese Patent Application No. 2009-294249, filed on Dec. 25, 2009; the entire contents of which are incorporated herein by reference.

FIELD

Embodiments described herein relate generally to an apparatus and a method for generating an image having restored color, and an apparatus for displaying the image.

BACKGROUND

As to a gamut of color reproduction (Hereinafter, it is called "gamut") representing an image signal (defined by standard of broadcast wave), its range is narrower than a color range of natural recognized by the naked eye of human. For example, a gamut represented in digital broadcast is defined by ITU-R BT.709. This gamut is a limited range in visible light. Briefly, if a subject has a color outside the gamut of BT.709, color information of the subject (captured as the image) is compressed within the gamut of ITU-R BT.709, and a broadcast wave having compressed color information is generated.

On the other hand, recently, by development of a color image display device, a gamut of the device is widening. For example, the display device using an organic EL or a wide gamut LCD is spreading. As to the LCD, by improvement of a light source or a color filter, its color purity can be heightened. Alternatively, by increasing a primary color of color LED (used for backlight of LCD), wider gamut can be realized. In these display devices, a color having wider range than ITU-R BT.709 can be represented.

When a broadcast wave is displayed on the display device having wider range, if an image signal of the broadcast wave is displayed with fidelity, a merit to display in the wide gamut is lost. Furthermore, when the gamut of ITU-R BT.709 is expanded to a gamut reproduced by the display device, the subject is unnaturally displayed with clear color different from its original color.

Accordingly, technique to estimate an original color of the subject from the image signal having compressed gamut and to restore the original color is necessary. As to pixels having saturated color over a prescribed gamut, each signal value (RGB) of the pixels is often compressed as the maximum (255). In this case, a method for estimating original signal values (not saturated) of the pixels using a dichromatic reflection model is proposed. For example, this method is disclosed in "Color Restoration From Saturated Images—Restoration method up to 2 channel saturations—" Takanori TAMAKI, Toshikazu WADA, Kazumasa SUZUKI (Wakayama University), IEICE Technical Report, vol. 108, no. 484, PRMU2008-243, pp. 19-24, March 2009 . . . reference 1.

However, after capturing an image of the subject, in process to compress a gamut of the image, various transforms are executed to the image. The various transforms include not only clipping of pixel value (having saturated gamut as mentioned above) but also gamut mapping or transform by tone-curve. The input image signal does not have information representing which transform was executed to the image. Accordingly, restoration of the original color of the image is difficult.

Briefly, in above-mentioned conventional technique, after capturing an image of the subject, a gamut lost in process to compress the image cannot be correctly restored.

DETAILED DESCRIPTION

Figure 1:
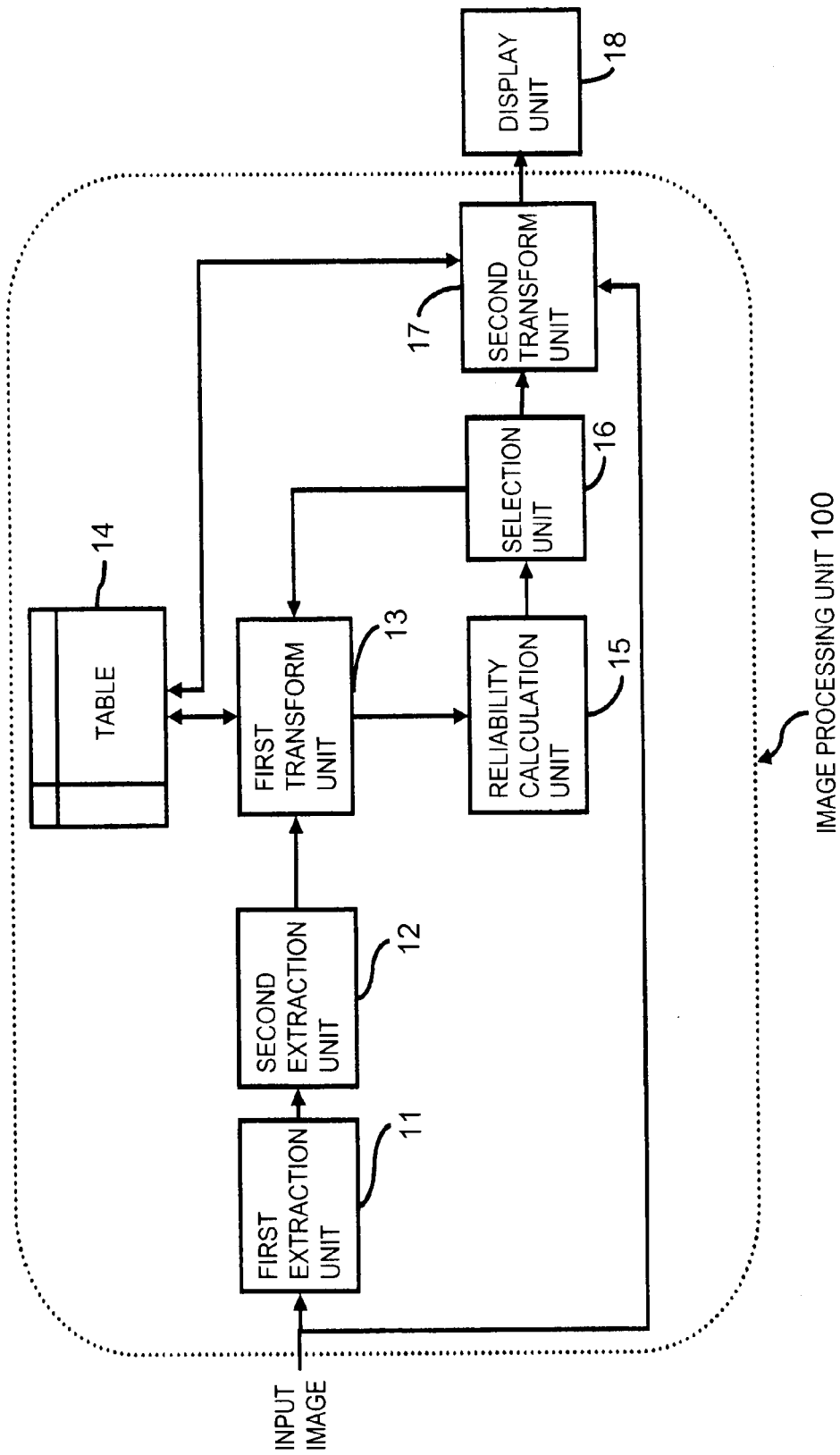
FIG. 1 is a block diagram of an image display apparatus according to a first embodiment.

In general, according to one embodiment, an apparatus for processing an image includes a first extraction unit, a second extraction unit, a first transform unit, a reliability calculation unit, a selection unit, and a second transform unit. The first extraction unit is configured to extract a first group of pixels of which hue is similar to a specific hue, from an input image. The second extraction unit is configured to extract a second group of pixels of which distance from a reference axis on a plane defined by a chroma axis and a luminance axis is relatively large, from the first group. The first transform unit is configured to execute a plurality of color-transform processing to the second group, and to obtain a plurality of third groups of pixels. Each third group is the second group transformed by each color-transform processing. The reliability calculation unit is configured to calculate a reliability of each third group. The reliability is larger when pixels of the third group are more located in shape of a straight line on the plane. The selection unit is configured to select a color-transform processing by which the third group has the largest reliability, from the plurality of color-transform processing. The second transform unit is configured to execute the color-transform processing to the input image to obtain an output image.

Hereinafter, embodiments of the present invention will be explained by referring to the drawings. The present invention is not limited to the following embodiments.

The First Embodiment

As shown in FIG. 1, the image display apparatus includes an image processing apparatus 100 and a display unit 18. The image processing apparatus 100 includes a first extraction unit 11, a second extraction unit 12, a first transform unit 13, a table 14, a reliability calculation unit 15, a selection unit 16, and a second transform unit 17.

The first extraction unit 11 extracts a first group of pixels having a specific hue from pixels of an input image. In the first embodiment, an image that signals received as broadcast wave are decoded is regarded as the input image.

The second extraction unit 12 extracts a second group of pixels having a large distance between each pixel and a reference axis on a plane represented by a chroma axis and a luminance axis, from the first group.

The first transform unit 13 executes a plurality of color-transform processing to the second group. A group of pixels executed by the color-transform processing is called a third group of pixels.

The table 14 has a plurality of color-transform tables used by the first transform unit 13. Moreover, the color-transform table (stored in the table 14) had better be determined by characteristics of the display unit 18.

The reliability calculation unit 15 calculates a reliability of each color-transform processing (corresponding to a color-transform table). In this case, more straightly pixels of the third group are located on a plane represented by a chroma axis and a luminance axis, the higher the reliability is.

The selection unit 16 selects the color-transform processing having the highest reliability from the plurality of color-transform processing.

The second transform unit 17 executes the color-transform processing (selected by the selection unit 16) to the input image, and obtains an output image.

The display unit 18 displays the output image. Any device can be used as the display unit 18 if information such as an image can be displayed. For example, a liquid crystal panel, an organic EL panel, a plasma display panel, or a CRT, may be used. Moreover, a device having a gamut wider than that of signal of the input image is desirable. For example, the organic EL panel, or LCD having a backlight of primary color LED, can be used.

Figure 2:
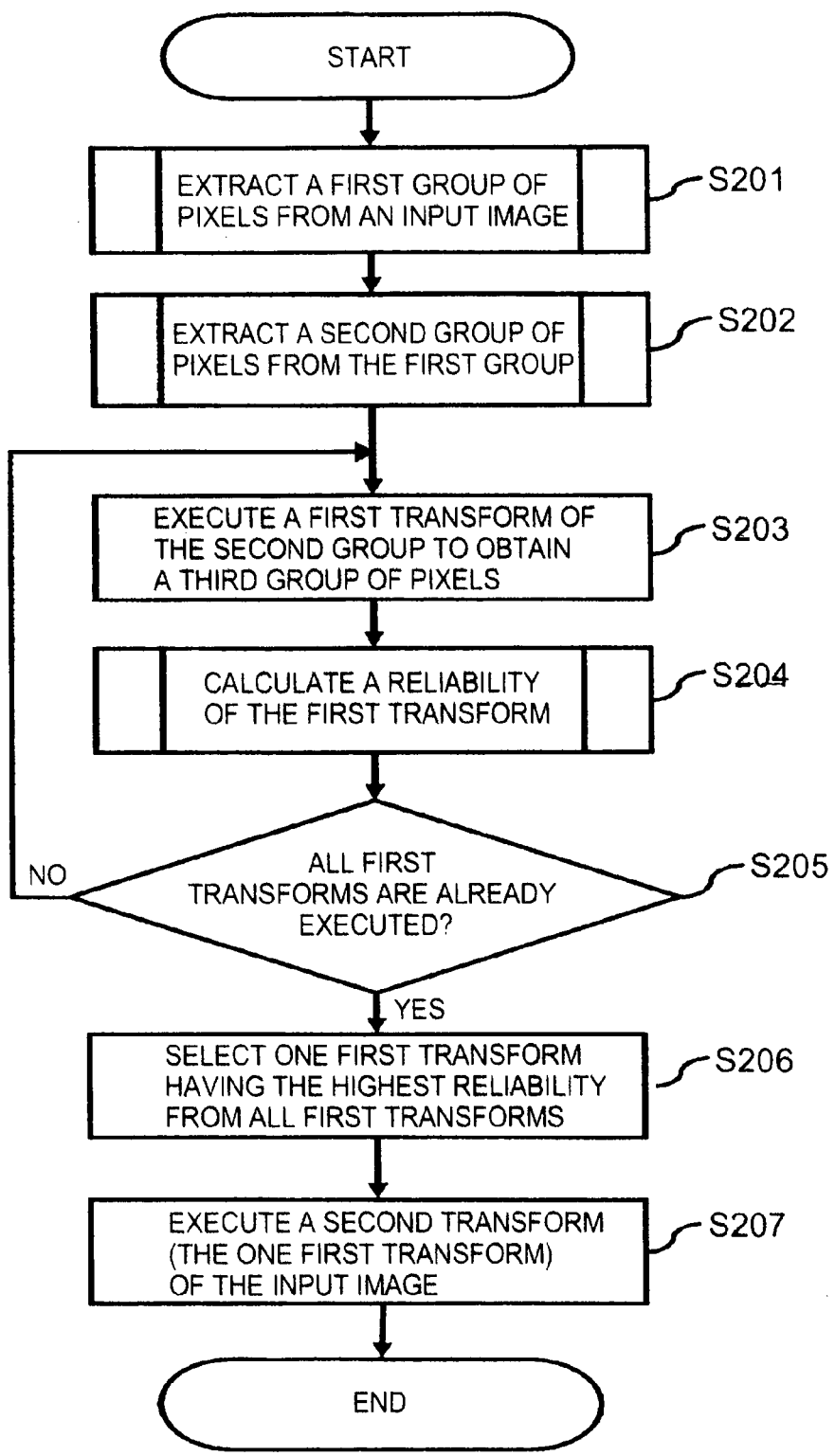
FIG. 2 is a flow chart of processing of the image display apparatus in FIG. 1.

In FIG. 2, at S201, the first extraction unit 11 extracts a first group of pixels from the input image. Detail processing is explained afterwards by referring to FIG. 3.

At S202, the second extraction unit 12 extracts a second group of pixels from the first group. Detail processing is explained afterwards by referring to FIG. 4.

At S203, the first transform unit 13 executes transform processing to each pixel of the second group, and obtains a third group of pixels as the transformed second group. The transform processing is based on one transform table in a plurality of transform tables stored in the table 14. By using the transform table, each pixel value (including a luminance, a chroma and a hue) is transformed.

A range of a gamut (of color reproduction) representing an image signal (defined by standard of broadcast wave) is narrower than a color range of natural recognized by the naked eye of human. For example, a gamut represented in digital broadcast is defined by ITU-R BT.709. The range of the gamut is limited in visible light. Briefly, if a subject has a color outside the gamut of BT.709, color information of the subject (captured as the image) is compressed within the gamut of ITU-R BT.709, and a broadcast wave having compressed color information is generated.

As a method for compressing color, clipping of pixel value, gamut mapping to transform to another gamut, and transform by tone-curve, are used. For example, there is a plurality of gamut mapping methods generally used. However, which gamut mapping to use is not defined by ITU-R BT.709. Because characteristic of color-change before and after transform is often antinomy. For example, if constancy of color is attached with importance, artifact of gradation is apt to occur. As to a mapping to maintain a hue, a luminance is apt to change. Accordingly, in case of compressing the image, one transform method is selected from a plurality of transform methods in accordance with use for purpose or liking. In the table 14, a plurality of transform tables each representing inverse transform of compression processing is stored. For example, generally used gamut mappings (clipping of pixel value, a gamut mapping to transform to another gamut, and a transform by tone-curve) are stored as the plurality of transform tables.

At S204, the reliability calculation unit 15 calculates a reliability of transform processing (executed at S203). Detail processing is explained afterwards by referring to FIG. 5.

At S205, the selection unit 16 decides whether all transform tables stored in the table 14 were already executed. If at least one of all transform tables is not executed yet (No at S205), processing is returned to S203. In this case, the first transform unit 13 executes transform processing by using a transform table not executed yet. If all transform tables are already executed (Yes at S205), processing is forwarded to S206.

At S206, the selection unit 16 selects one transform table having the highest reliability from all transform tables executed at S203.

At S207, the second transform unit 17 executes transform processing to each pixel of the input image by using the one transform table (selected at S206), and obtains an output image. The display unit 18 displays the output image, and entire transform processing is completed.

Figure 3:
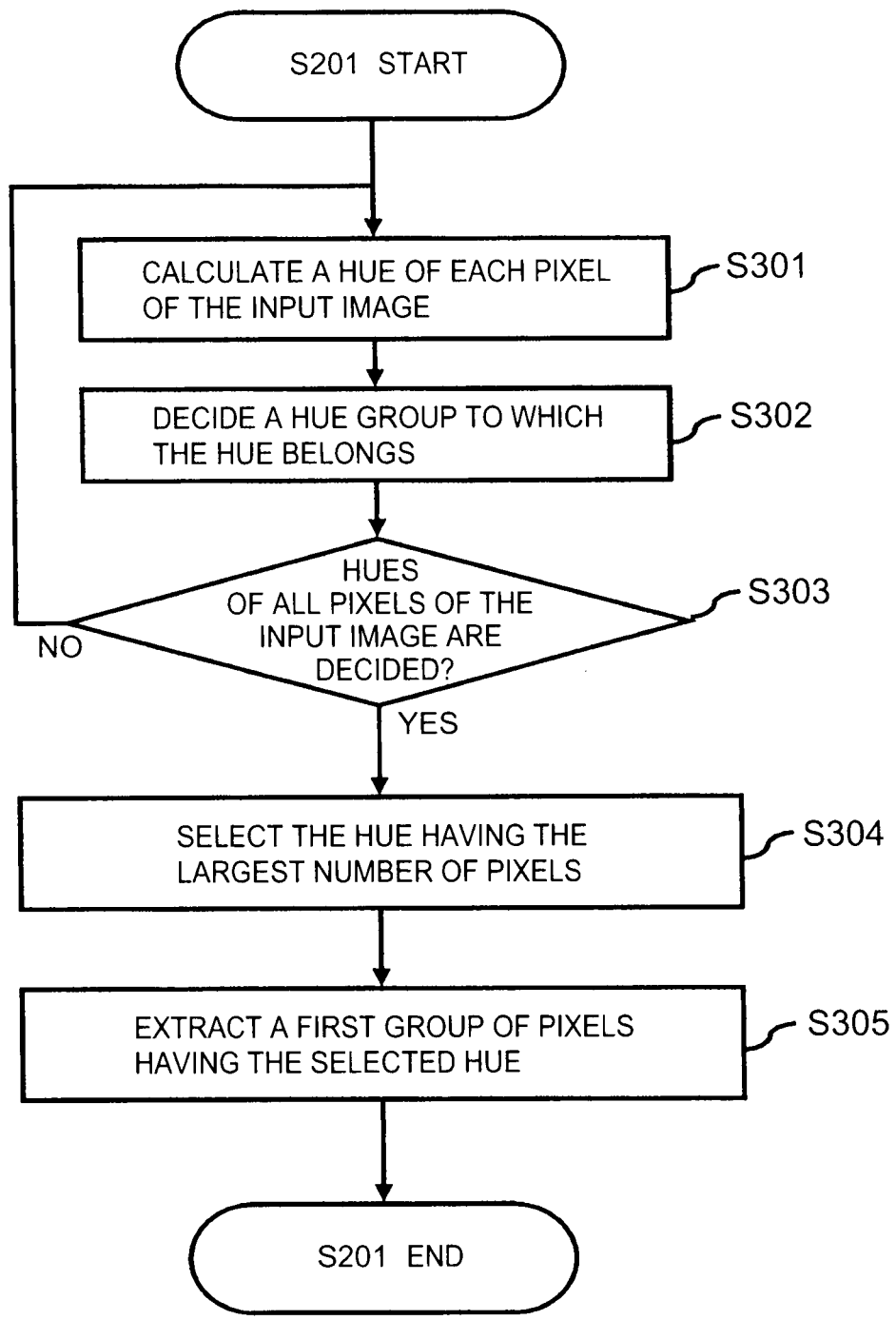
FIG. 3 is a flow chart of processing of a first extraction unit in FIG. 1.

All processing in flow chart of FIG. 3 are performed by the first extraction unit 11. At S301, a hue of each pixel of the input image is calculated. For example, if the input image has RGB signals, the hue H is calculated by following equation.

$$\tan H = \frac{\sqrt{3}\,(G-B)}{2R-G-B} \tag{1}$$

At S302, pixels of the input image are classified to a plurality of groups in accordance with the hue of each pixel (calculated at S301). In the first embodiment, by equally classifying hues of all pixels into N groups, N hue groups (the number thereof is N) are determined. In this case, the hues of all pixels may not be equally classified. A hue of each pixel is decided to belong to which hue group, and a hue group is voted whenever each pixel is decided to be included in the hue group.

At S303, it is decided whether hues of all pixels of the input image were already decided to belong to which hue group. If the hues of all pixels were already decided (Yes at S303), processing is forwarded to S304. If a hue of at least one pixel is not decided yet (No at S303), processing is returned to S301.

At S304, one hue group having the largest number of voted pixels is selected. At S305, pixels of the one hue group (selected at S303) are extracted as a first group of pixels. The first group is sent to the second extraction unit 12, and processing of S201 is completed.

Assume that the input image is represented as dichromatic reflection model (shown in equation (2)). In this case, a color of an object (color) is represented as a linear sum of a diffuse component (Diffuse) and a specular component (Specular).

$$\text{color} = \alpha \times \text{Diffuse} + \beta \times \text{Specular} \tag{2}$$

In the equation (2), "α and β" are scalar values, and "color, Diffuse and Specular" are three-dimensional vectors. The specular component is a color component to reflect a light from a light source. As to the image of which white balance is sufficiently adjusted, the specular component is regarded as white. Contrary to this, the diffuse component is a color determined by a surface material of the subject, which is unknown color. Colors represented as a linear sum of white and unknown color have same hue value. Accordingly, pixels of which hues are similar are approximately regarded to be the same surface material. The first group of pixels is regarded as a group having pixels of the same surface material (approximately extracted).

Figure 4:
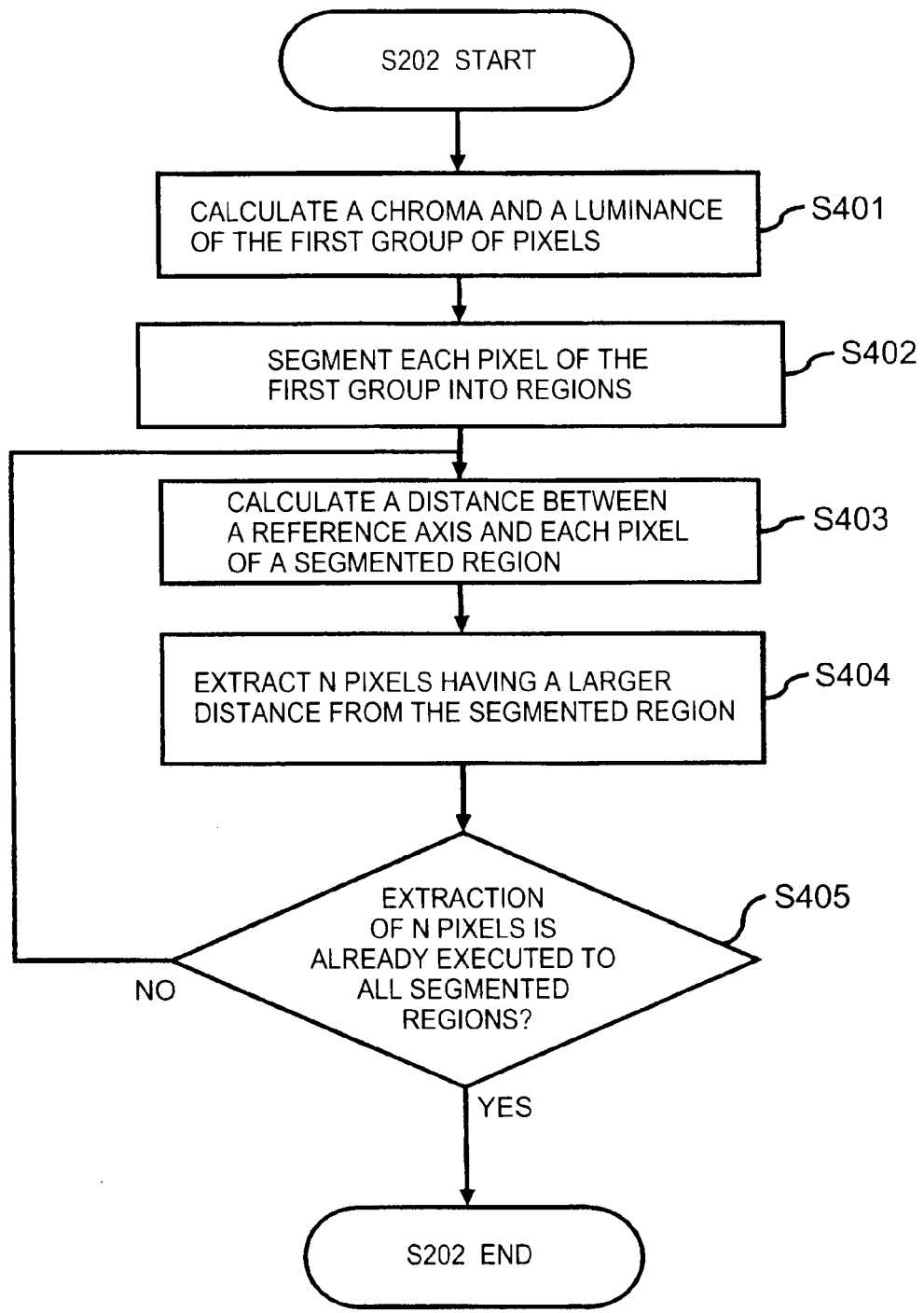
FIG. 4 is a flow chart of processing of a second extraction unit in FIG. 1.
Figure 5A:
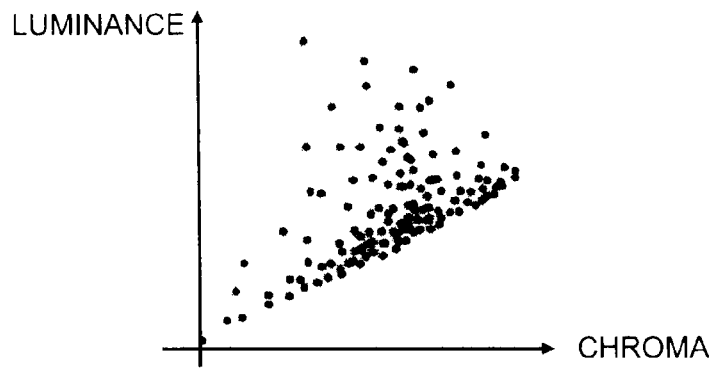
FIGS. 5A, 5B and 5C are graphs showing distribution of pixels and a reference axis on a plane represented by a chroma axis and a luminance axis.

All processing of FIG. 4 are executed by the second extraction unit 12. At S401, each pixel value of the first group is transformed to a chroma and a luminance. For example, each pixel value is mapped onto a plane represented by a chroma axis and a luminance axis as shown in FIG. 5A.

At s402, based on a reference axis predefined on the plane, pixels of the first group are segmented into a plurality of regions (Hereinafter, it is called "segmented region").

Figure 5B:
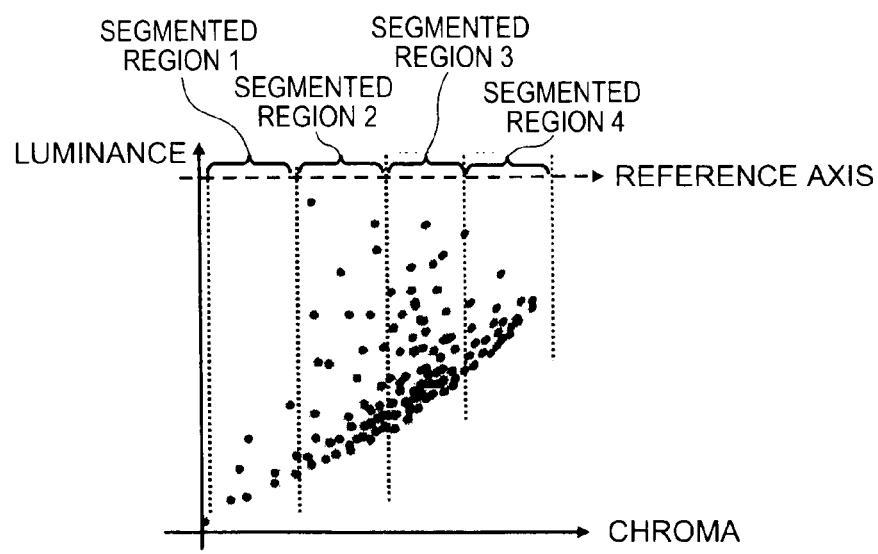
Figure 5C:
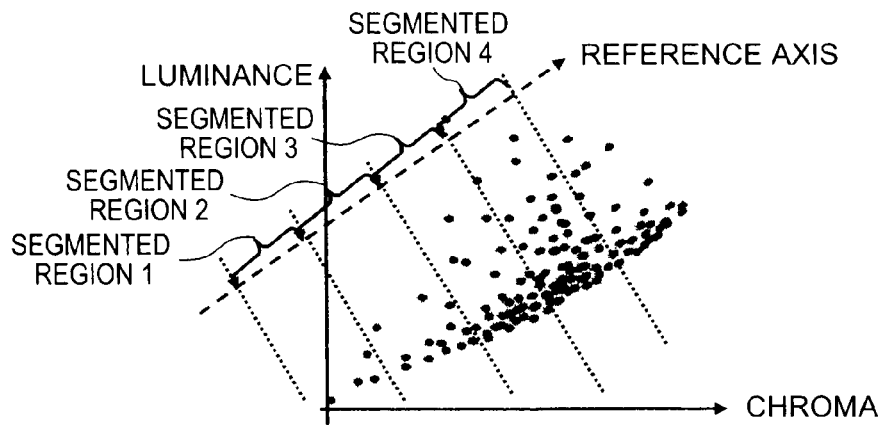

As shown in FIGS. 5B and 5C, segmented regions may be differently determined by each reference axis. The reference axis is any axis crossing the luminance axis. The reference axis may be determined previously or by distribution of pixels of the first group. In FIGS. 5A and 5B, segmented regions are determined with as lines perpendicular to the reference axis. However, the segmented regions may be determined with lines not perpendicular to the reference axis.

If the reference axis is set in parallel with the chroma axis as shown in FIG. 5B, pixels having low luminance are extracted from each segmented region. In an example of FIG. 5B, load to calculate a distance between each pixel and the reference axis can be reduced. On the other hand, in an example of FIG. 5C, the reference axis is set in parallel with distribution of pixels.

At S403, one segmented region as a processing object is selected from all segmented regions. A distance between the reference axis and each pixel of the one segmented region is calculated.

At S404, a specific number (N) of pixels are selected in order of larger distance from all pixels of the one segmented region. N may be different for each segmented region. Furthermore, N may be varied in accordance with the number of pixels included in the segmented region. Extracted pixels are regarded as a second group of pixels.

At S405, it is decided whether pixel-extraction processing of S404 was already executed for all segmented regions. If the pixel-extraction processing is not for at least one segmented region (No at S405), processing is returned to S403. If the pixel-extraction processing was already executed for all segmented regions (Yes at S405), the second group of pixels is sent to the first transform unit 13, and processing of S202 is completed.

Figure 7A:
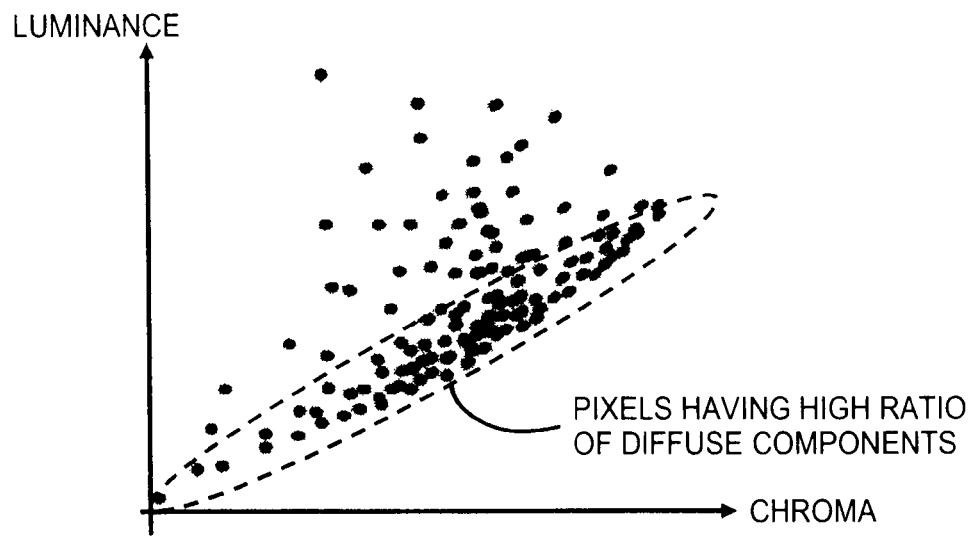
FIGS. 7A and 7B are graphs showing distribution of pixels having high ratio of diffuse components and angle θ on the plane in FIG. 5.

Extraction processing by the second extraction unit 12 is equivalent to, extraction of pixels which ratio of diffuse components to specular components is high, from the first group of pixels estimated to belong to the same surface material. Assume that the image is represented as dichromatic reflection model (shown in the equation (2)). In this case, when pixels belonging to the same surface material are plotted, as shown in FIG. 7A, pixels of which ratio of diffuse components to specular components is high are apt to gather at a lower edge of the distribution. This reason is, because specular components are white, a low ratio of specular components in the pixels is equivalent to a low luminance. In this way, a plurality of pixels located at a lower edge in pixel-distribution region is extracted as pixels of which ratio of diffuse components to specular components is high, i.e., a second group of pixels, by above-mentioned method.

Figure 6:
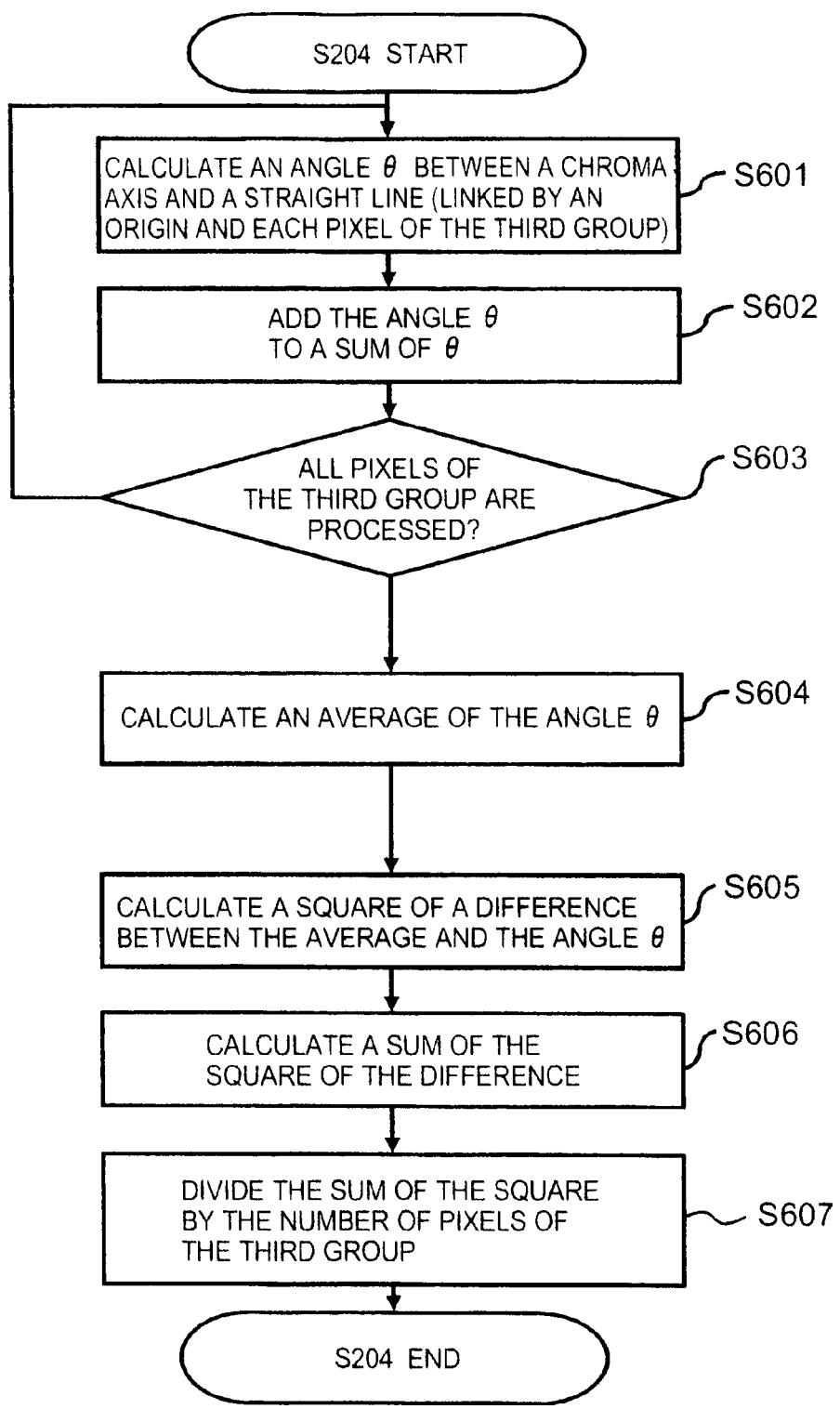
FIG. 6 is a flow chart of processing of a reliability calculation unit in FIG. 1.
Figure 7B:
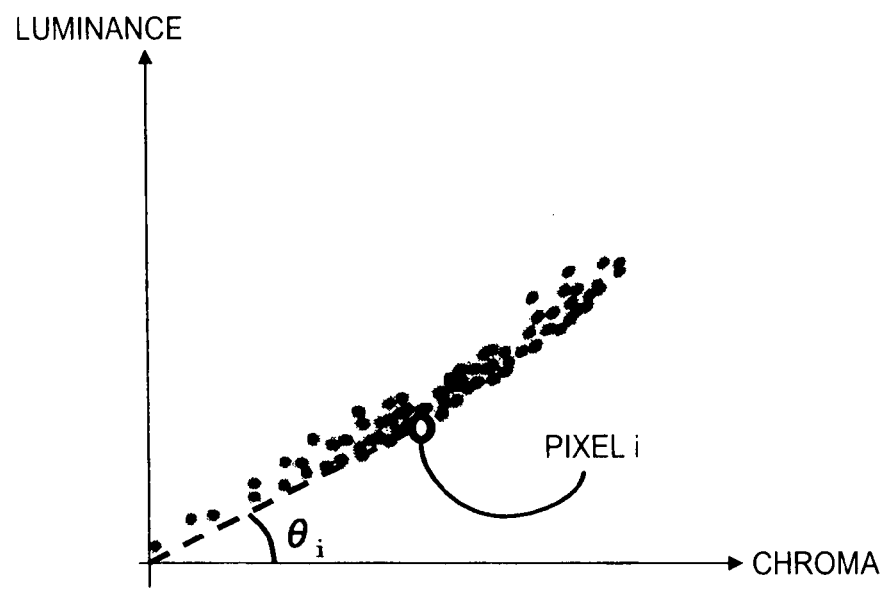

In a flow chart of FIG. 6, each step of S204 is performed by the reliability calculation unit 15. At S601, an angle θ between the chroma axis and a straight line linked by an origin (on chroma-luminance plane) and each pixel of the third group (the second group transformed at S203) is calculated. In FIG. 7B, an example of the angle $\theta_i$ between the chroma axis and a straight line linked by the origin and some pixel i is shown.

At S602, the angle $\theta_i$ is added to a sum of angle θ. At S603, it is decided whether calculation of angle θ is executed for all pixels of the third group. If calculation of angle θ is executed for all pixels (Yes at S603), processing is forwarded to S604. If calculation of angle θ is not executed for at least one pixel (No at S603), processing is returned to S601.

At S604, the sum of angle θ is divided by the number of pixels of the third group, and an average of angle θ is calculated. At S605, a square of difference between the angle $\theta_i$ of each pixel (calculated at S601) and the average of angle θ (calculated at S604) is calculated for all pixels of the third group. At S606, a sum of the square of difference of all pixels of the third group is calculated.

At S607, the sum of square (calculated at S606) is divided by the number of pixels of the third group. From a quotient calculated at S607, a reliability of the transform used at S203 is calculated.

$$\bar{\theta} = \frac{1}{n}\sum_{i=1}^{n}\theta_i \qquad (3)$$

$$V = \frac{1}{n}\sum_{i=1}^{n}(\bar{\theta} - \theta_i)^2$$

$$R = -1 \times V$$

In equations (3), "θ" is an angle between the chroma axis and a straight line linked by the origin and each pixel of the third group. "i" is an index of each pixe. "n" is the number of pixels of the third group, and "R" is the reliability.

If gamut-compression processing (such as gamut mapping) is not executed for the input image, a group of pixels of diffuse components is distributed in shape of straight line. On the other hand, if the gamut-compression processing is executed for the input image, the group of pixels is distributed with distortion. Accordingly, based on whether distribution of the third group of pixels is in shape of straight line, the reliability of the transform at S203 is calculated.

If the input image is represented as dichromatic reflection model, pixels having high ratio of diffuse components are distributed in shape of straight line. This is clear that, because "β" in the equation (2) is approximated as "0", color of pixels is represented as constant times of diffuse components. Briefly, if the input image has distribution of pixels as a natural image, it is reasonable that pixels having high ratio of diffuse components are distributed in shape of straight line. This means that, the smaller the dispersion of the angle θ is, the more the distribution of pixels gathers at an average of the angle θ. Briefly, pixels of which angles θ are equal or near are distributed in shape of a straight line.

In the image processing apparatus of the first embodiment, unknown transform executed to the input image is estimated, and a transform most similar to the unknown transform is selected from a plurality of transform candidates in accordance with a reliability of each transform candidate. Moreover, if the number of transform candidates stored in the table 14 is larger, accuracy to estimate the unknown transform more rises. Furthermore, in order to prepare the case that transform executed to the input image is not a general one, non-transform that the input image is output (as it is) is stored as a transform candidate. By calculating the reliability of non-transform at S204, bad influence by erroneous estimation of transform can be lowered.

The Second Embodiment

As to the first extraction unit 11, the first group of pixels may be extracted by using not only a difference between hues of pixels but also a spatial distance between pixels in the image. If surface materials of pixels are same, the pixels are physically continuous. Briefly, if pixels are spatially near, possibility that the pixels belong to the same surface material is high. Accordingly, the first extraction unit 11 calculates an average of spatial positions of pixels having the same hue (selected at S305) in the image. Pixels of which distance from the average is below a specific threshold are extracted as the first group of pixels. As a result, accuracy to extract pixels belonging to the same surface material more rises, and calculation of the reliability can be more correctly executed.

The Third Embodiment

In the third embodiment, as to the first extraction unit 11, extraction of a plurality of the first groups is different from the first embodiment.

In the same way as the first embodiment, the second extraction unit 12 extracts pixels having high ratio of diffuse components for each first group. The reliability calculation unit 15 calculates a reliability of the transform by a degree which pixels of each first group are distributed in shape of a straight line. The reliability is calculated as a weighted average of the degree of each first group by the number of pixels of each first group as a weight. Concretely, the reliability is calculated using the equation (3).

When color of pixels of the input image is restored, if ideal tone-mapping was already executed to the pixels, pixels of diffuse components for all surface materials are distributed in shape of a straight line. By evaluating straight-linearity of diffuse components for a larger number of surface materials, accuracy of estimation rises because the number of samples is larger. Accordingly, in this component, accuracy to calculate the reliability of tone-mapping rises, and effect that tone-mapping is more correctly decided as the transform is obtained. If the image does not include an enlarged object with a large size, a plurality of surface materials often exists in the image. Accordingly, by extracting pixels belonging to the plurality of surface materials and calculating the reliability, color of the image can be correctly restored.

The Fourth Embodiment

As to the first extraction unit 11, by dividing the input image into a plurality of blocks, processing of S201-S204 may be executed for each block. As mentioned-above, by calculating the reliability for a plurality of surface materials, accuracy of estimation of the transform rises. Furthermore, pixels belonging to the same surface material are spatially near on the input image.

By using this characteristics, the input image is divided into a plurality of block regions. Pixels belonging to the same block are spatially near on the input image. Accordingly, these pixels can be regarded as the same surface material. As to the reliability of a transform for each block, an average of the reliability of all blocks is calculated as a reliability of the transform. By referring to the reliability of each transform, one transform having the largest reliability is selected at S206.

Modifications

The First Modification

As to the first extraction unit 11, extraction processing is executed by degreasing the number of pixels of the input image. Concretely, an image is created by sampling pixels from the input image at an equal interval, and this image is input in place of the input image to the first extraction unit 11. In this case, as to the second transform unit 17, the input image is used in the same way as the first embodiment. In the first modification, the processing load can be reduced.

The Second Modification

In addition to the first embodiment, detection of scene-change is executed for a plurality of frames in time series. When scene-change is detected at a frame, the same processing as the first embodiment is executed to a next frame. As to other frames, by using a transform table applied at the same scene (the next frame), the second transform unit 17 executes transform processing. In the second modification, in addition to reduction of the processing load, image quality improves by suppressing flicker.

The Third Modification

When all reliabilities (calculated by the reliability calculation unit 15) are below the threshold, the selection unit 16 selects tone-mapping corresponding to non-transform. In the third modification, fall of image quality by executing erroneous tone-mapping to the input image can be suppressed.

In the disclosed embodiments, the processing can be performed by a computer program stored in a computer-readable medium.

In the embodiments, the computer readable medium may be, for example, a magnetic disk, a flexible disk, a hard disk, an optical disk (e.g., CD-ROM, CD-R, DVD), an optical magnetic disk (e.g., MD). However, any computer readable medium, which is configured to store a computer program for causing a computer to perform the processing described above, may be used.

Furthermore, based on an indication of the program installed from the memory device to the computer, OS (operation system) operating on the computer, or MW (middle ware software), such as database management software or network, may execute one part of each processing to realize the embodiments.

Furthermore, the memory device is not limited to a device independent from the computer. By downloading a program transmitted through a LAN or the Internet, a memory device in which the program is stored is included. Furthermore, the memory device is not limited to one. In the case that the processing of the embodiments is executed by a plurality of memory devices, a plurality of memory devices may be included in the memory device.

A computer may execute each processing stage of the embodiments according to the program stored in the memory device. The computer may be one apparatus such as a personal computer or a system in which a plurality of processing apparatuses are connected through a network. Furthermore, the computer is not limited to a personal computer. Those skilled in the art will appreciate that a computer includes a processing unit in an information processor, a microcomputer, and so on. In short, the equipment and the apparatus that can execute the functions in embodiments using the program are generally called the computer.

While certain embodiments have been described, these embodiments have been presented by way of examples only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An apparatus for processing an input image, comprising:
a first extraction unit configured to classify pixels of the input image into a plurality of groups, all hues of the pixels being classified to the plurality of groups, each respective pixel of the pixels being classified to one of the groups of which classified hues include a hue of the respective pixel, and to extract a first group of which the number of classified pixels is largest among the plurality of groups;
a second extraction unit configured to extract a specific number of pixels as a second group in order of larger distance from a reference axis on a plane defined by a chroma axis and a luminance axis crossing the reference axis, from the first group;
a first transform unit configured to execute a plurality of color-transform processing to the second group, and to obtain a plurality of third groups of pixels, each third group being the second group transformed by each color-transform processing;
a reliability calculation unit configured to calculate a reliability of each third group, the reliability being larger when pixels of the third group being more located in shape of a straight line on the plane;
a selection unit configured to select a color-transform processing by which the third group has the largest reliability, from the plurality of color-transform processing; and
a second transform unit configured to execute the color-transform processing to the input image to obtain an output image.

2. The apparatus according to claim 1, wherein
the second extraction unit segments the plane into a plurality of regions, and extracts the specific number of pixels as the second group, from each region.

3. The apparatus according to claim 2, wherein
the reliability calculation unit calculates the reliability as a lower value when distribution of angle between a straight line and the chroma axis or the luminance axis is larger on the plane, the straight line being linked by an origin and each pixel of the third group on the plane.

4. The apparatus according to claim 3, wherein
the first extraction unit extracts the first group from the input image of which the number of pixels is decreased.

5. The apparatus according to claim 3, wherein
the selection unit selects processing to output the input image without the color-transform processing when all reliabilities of the plurality of third groups are below a first threshold.

6. The apparatus according to claim 3, wherein
the first extraction unit extracts one group of which the number of classified pixels is largest among the plurality of groups, calculates an average of positions of the pixels on the input image, and extracts the first group of pixels of which distance from the average on the input image is below a second threshold.

7. An apparatus for displaying an image, comprising:
an image processing apparatus according to claim 1; and
a display unit configured to display the output image obtained by the image processing apparatus.

8. A method for processing an input image, the method being performed by a computer to perform operations comprising:
classifying, by the computer, pixels of the input image to a plurality of groups, all hues of the pixels being classified to the plurality of groups, each respective pixel of the pixels being classified to one of the groups of which classified hues include a hue of the respective pixel;
extracting, by the computer, a first group of which the number of classified pixels is largest among the plurality of groups;
extracting, by the computer, a specific number of pixels as a second group in order of larger distance from a reference axis on a plane defined by a chroma axis and a luminance axis crossing the reference axis, from the first group;
executing, by the computer, a plurality of color-transform processing to the second group;
obtaining, by the computer, a plurality of third groups of pixels, each third group being the second group transformed by each color-transform processing;
calculating, by the computer, a reliability of each third group, the reliability being larger when pixels of the third group being more located in shape of a straight line on the plane;
selecting, by the computer, a color-transform processing by which the third group has the largest reliability, from the plurality of color-transform processing; and
executing, by the computer, the color-transform processing to the input image to obtain an output image via a display unit.

* * * * *